United States Patent [19]
Rodgers et al.

[11] Patent Number: 5,724,864
[45] Date of Patent: Mar. 10, 1998

[54] DRIVE AXLE BREATHER

[75] Inventors: Mark E. Rodgers, Augusta; Leo J. Wenstrup, Portage; Dale J. Kubicek, Gobles; Lawrence P. Wagle, Fulton; Anthony Militello, Portage; Timothy J. Morscheck, Kalamazoo; Robert E. Crepas, Mattawan, all of Mich.

[73] Assignee: Eaton Corporation, Cleveland, Ohio

[21] Appl. No.: 683,350

[22] Filed: Jul. 18, 1996

[51] Int. Cl.$^6$ ............................................. F16H 57/02
[52] U.S. Cl. ................................................ 74/606 R
[58] Field of Search ........................... 74/606 R, 718, 74/720, 665 R, 665 F

[56] References Cited

U.S. PATENT DOCUMENTS

| | | | |
|---|---|---|---|
| 2,644,609 | 7/1953 | Foss | 220/44 |
| 2,933,102 | 4/1960 | Hillman et al. | 137/525.3 |
| 3,145,582 | 8/1964 | Wagner | 74/606 R |
| 3,314,306 | 4/1967 | Barclae | 74/606 R |
| 3,432,996 | 3/1969 | Patterson | 55/189 |
| 3,686,973 | 8/1972 | Davison et al. | 74/606 R |
| 4,351,203 | 9/1982 | Fukunaga | 74/606 R |
| 4,506,562 | 3/1985 | Yamaura et al. | 74/606 R |
| 4,554,844 | 11/1985 | Hamano | 74/606 R |
| 4,595,118 | 6/1986 | Azuma et al. | 74/606 R X |
| 4,761,867 | 8/1988 | Vollmer | 29/159.2 |
| 4,862,025 | 8/1989 | Dieker | 310/68 |
| 5,024,345 | 6/1991 | Deweerdt | 220/366 |
| 5,370,018 | 12/1994 | Kwasniewski | 74/606 |

*Primary Examiner*—Vinh T. Luong
*Attorney, Agent, or Firm*—Howard D. Gordon

[57] ABSTRACT

A breather assembly (100) for a vehicular drive axle (10). The breather assembly includes a body member (102) having a vertically extending drainback tube portion (114) and a horizontally extending connecting portion (120), and a curved formed hose member (104) to minimize leakage of lubricant (S) from the drive axle axle housing (26) and ingestion of exterior water into the housing.

39 Claims, 4 Drawing Sheets

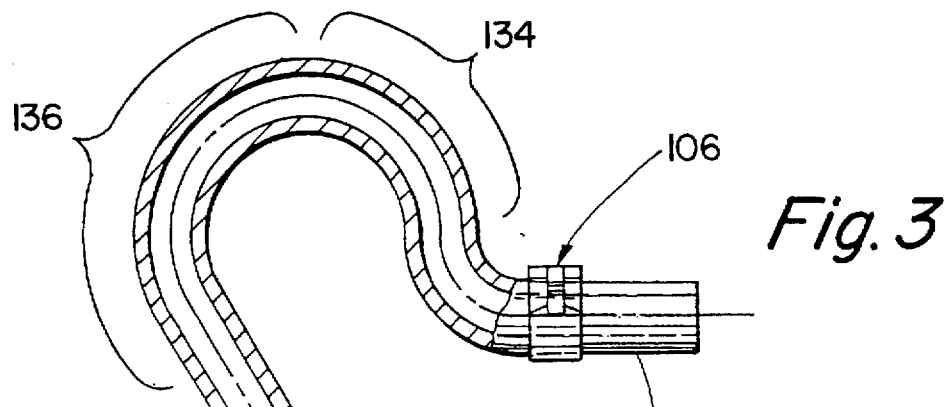
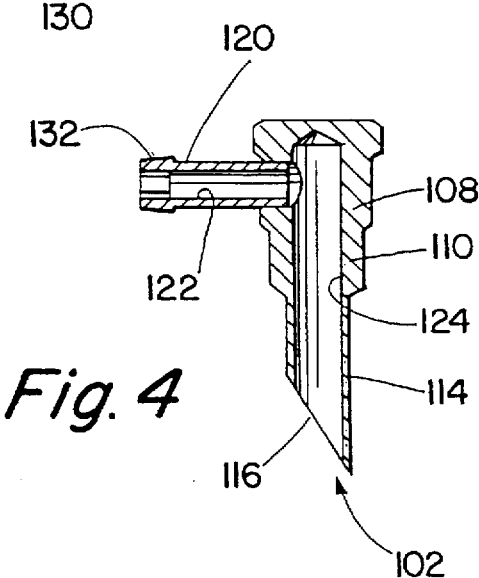
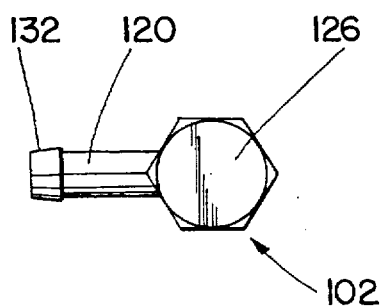
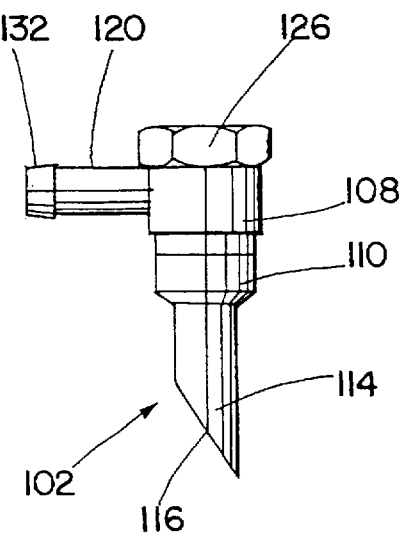

DRIVE AXLE BREATHER

BACKGROUND OF THE INVENTION

1. Field of the Invention

The present invention relates to a breather assembly for a vehicular drive axle. In particular, the present invention relates to a breather assembly for vehicular drive axles which will prevent vacuum or pressure buildup in the axle housing while minimizing external water from entering the housing and axle lubricant from escaping from the housing.

2. Description of the Prior Art

Vehicular drive axle assemblies and, in particular, drive axle assemblies for heavy-duty vehicles are well known in the prior art, as may be seen by reference to U.S. Pat. Nos. 3,503,280; 3,769,533; 4,761,867; 4,862,025 and 5,370,018, the disclosures of which are incorporated herein by reference.

As is known, such drive axle assemblies typically include pinion, ring gear and differential gearing which rotates and churns in a lubricant sump within a sealed housing which, unless relieved, may result in a buildup of a vacuum or excessive pressure within the housing, which in turn may result in damage to the seals, improper lubricant flow and/or less than optimal operation of the axle mechanism. To relieve built-up vacuum and/or pressure within a drive axle housing, it is known to provide a venting device, usually referred to as a "breather" (see published European Pat. App. No. EP 702169A, assigned to EATON CORPORATION, the assignee of this application).

The prior art vehicular drive axle assembly breathers, and the drive axle assemblies utilizing same, were not totally satisfactory, as they allowed excessive water to enter the housing and/or excessive lubricant to escape from the housing, become blocked due to debris and/or bridging lubricant and/or were complicated and/or expensive to provide and/or install.

SUMMARY OF THE INVENTION

In accordance with the present invention, the drawbacks of the prior art are minimized or overcome by the provision of a breather assembly for a vehicular drive axle assembly which effectively prevents vacuum and/or pressure buildup in the axle housing while minimizing water ingestion into the axle housing and lubricant leakage from the axle housing.

The foregoing is accomplished by the provision of a breather assembly comprising a fitting piece which is threadably received in a threaded aperture through an upper axle housing wall and defining a generally downwardly extending drainback tube portion for extension into the housing and a generally horizontally extending tubular connector portion intended to extend rearwardly over the upper housing wall and to receive the end of a formed tubular or hose member having a horizontal portion at the fitting, an upward curved portion and a downward curved portion extending generally vertically downward to an opening well below the opening to the drainback tube portion. Preferably, the lower end opening of the drainback tube is beveled to provide an increased surface area to resist bridging of the opening.

Accordingly, it is an object of the present invention to provide a new and improved breather assembly for vehicular drive axles.

This and other objects and advantages of the present invention will become apparent from a reading of the following description of the preferred embodiment taken in connection with the attached drawings.

BRIEF DESCRIPTION OF THE DRAWINGS

FIG. 3 is a sectional view taken on a vertical plane of the hose portion and clamp member of the breather assembly of the present invention.

FIG. 4 is an enlarged sectional view taken on a vertical plane of the fitting member of the breather assembly of the present invention.

FIGS. 5A and 5B are, respectively, top and side views of the fitting member of the breather assembly of the present invention.

DESCRIPTION OF THE PREFERRED EMBODIMENT

Figure 1:
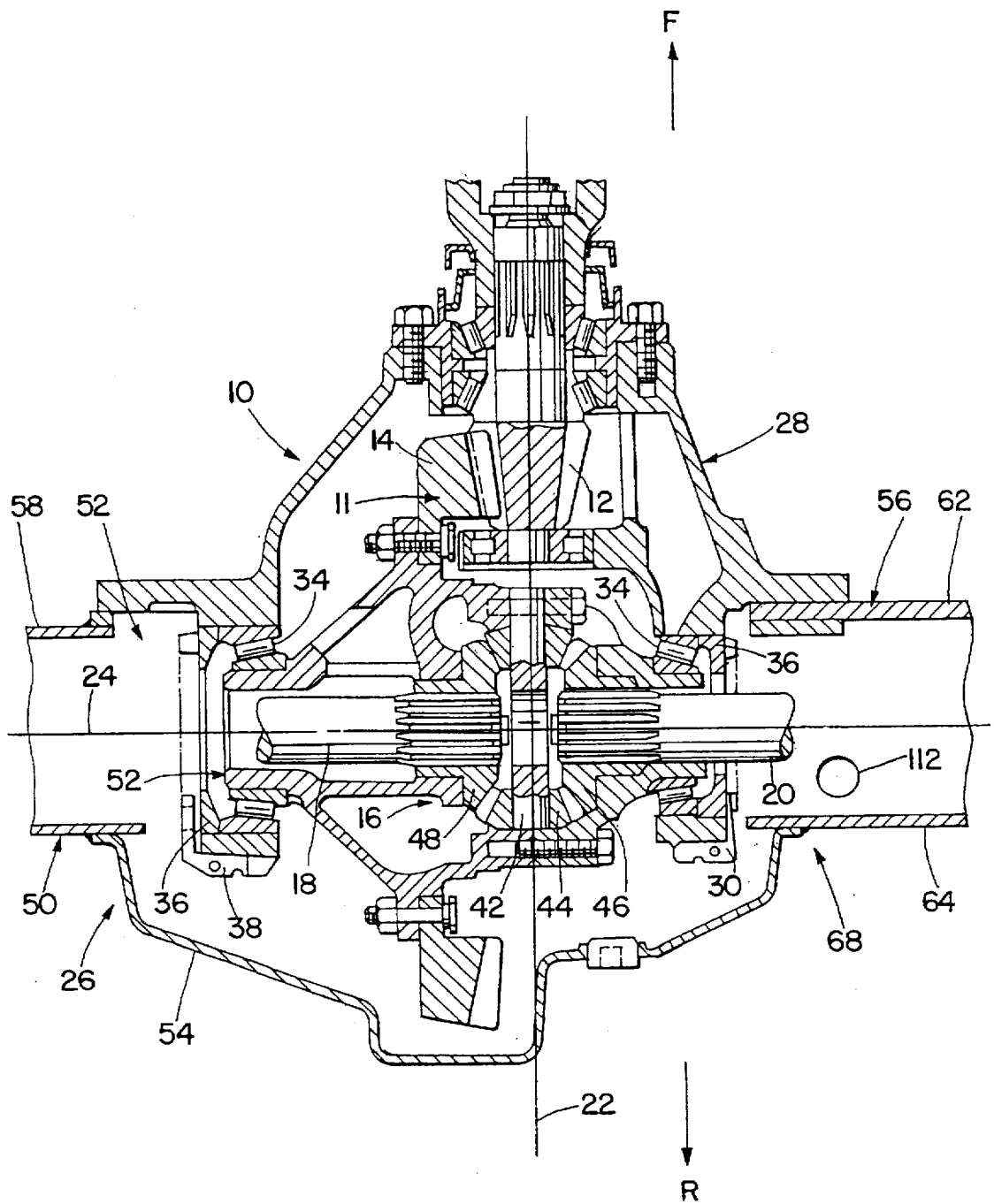
FIG. 1 is a partial sectional view taken on a horizontal plane of a typical prior art heavy-duty drive axle of the type with which the breather assembly of the present invention is advantageously utilized.

In the following description of the preferred embodiment of the present invention, certain terms will be used only for purposes of reference and are not intended to be limiting. The terms "upward," "downward," "rightward" and "leftward" refer to directions in the drawings to which reference is made. The terms "inward" and "outward" refer, respectively, to directions toward and away from the geometric center of the device described. The terms "forward" and "rearward" refer, respectively, to the front and rear ends of a vehicle as a rear-drive axle of the type illustrated in FIGS. 1 and a is typically mounted therein. Said terminology includes the words above specifically mentioned, derivatives thereof and words of similar import.

Heavy-duty vehicular drive axles utilizing ring gear/pinion gear right-angled gear sets are well known in the prior art, as may be seen by reference to aforementioned U.S. Pat. Nos. 4,761,867; 4,862,025 and 5,370,018. Referring to FIG. 1, a single-reduction drive axle 10 utilizing a right-angled gear set 11 comprising a pinion gear 12 meshingly engaged with a ring gear 14 is illustrated. It is understood that although the present invention is illustrated as utilized with a single-reduction, rear-drive axle, the present invention is fully applicable to two-speed and double-reduction axles and to drive-steer axles, as are well known in the prior art. A differential assembly 16 is fixed to the ring gear for driving the two axle shafts 18 and 20. Axle shafts 18 and 20 drive, respectively, the left- and righthand drive wheels (not shown). The axis of rotation 22 of the pinion gear 12 is substantially perpendicular to the axis of rotation 24 of ring gear 14 (and the differential 16 and axle shafts 18 and 20).

Heavy-duty drive axles of this type, and of the two-speed planetary, double-reduction type, are well known in the prior art. In the case of a rear-drive axle, the axle is oriented in the vehicle with the arrow F pointing to the forward end of the vehicle and the arrow R pointing to the rearward end of the vehicle, as illustrated in FIG. 1.

The drive axle assembly includes an axle housing assembly 26 having a differential head portion 28. The ring gear 14 is mounted for rotation by a differential carrier 30 by means of bolt-and-nut assemblies 32. The differential carrier is rotationally supported in the housing portion 28 by means of tapered bearings 32, which are adjustably positioned by bearing adjusters 36, which are maintained in position by bearing adjuster lock members 38 and bolts 40.

The differential carrier 30 carries a differential spider member 42 on which are rotatably received the differential pinion gears 44. The differential pinion gears are constantly meshed, respectively, with righthand and lefthand side gears 38 and 40, which side gears are rotatably engaged, respectively, by the drive shafts 20 and 18 by means of a splined connection. As is well known in the prior art, the rotational speed of ring gear 14 and differential carrier 30, which rotates therewith, is equal to the average speed of the side gears 46 and 48.

The axle housing assembly 26 includes an axle housing 50 having a generally centrally located forward opening 52 for receipt of the differential head portion 28, a rear cover 54 which may be welded or threadably attached to the housing 50, and rightwardly and leftwardly extending arm portions 56 and 58, respectively. Axle housings of this general type are well known in the prior art, as may be seen by reference to U.S. Pat. Nos. 3,015,238; 3,269,214 and 3,535,002, the disclosures of which are incorporated herein by reference. Typically, each of the arm portions, 56 and 58, will define an upper wall 60, a lower wall (not shown), a forward wall 62, and a rearward wall 64. The axle housing also defines a generally bowl-shaped area 66, where the differential head portion is received, and a transition area 68, where the bowl-shaped area meets the arms.

As is known, the various gears and shafts of the drive axle rotate and churn within a lubricant sump S which partially fills the axle housing assembly and which is maintained therein by means of seals and the like. Such rotation and churning within the axle housing may result in a vacuum or pressure buildup within the housing which, unless relieved, may adversely affect the operation of the housing and/or functioning of the various seal elements and the like.

The use of breathers to vent vacuum and/or pressure buildup within the axle housing is known in the prior art. The problem with the prior art devices was that they tended to be complicated and/or expensive to provide and/or they tended to permit excessive entry of external water into the axle housing and/or to permit excessive leakage of lubricant from the axle housing.

The breather assembly 100 of the present invention may be seen by reference to FIGS. 2-5B.

FIGS. 6A-6E illustrate the sequential steps of assembling the breather assembly of the present invention to an axle housing.

The breather assembly 100 consists of fitting member 102, a formed hose or tube member 104, and a clamp member 106.

The fitting member 102 may be metallic, such as, for example, a steel or brass, and includes a generally tubular shaped body portion 108 having external threads 110, such as 0.375-PTF SAE short pipe threads for sealing threaded receipt in an internally threaded breather hole bore 112 provided in the upper wall 60 of an axle housing arm adjacent the transition area 68. The fitting 102 further includes a drainback tube portion 114 extending vertically downwardly from the body portion 108 and terminating in a beveled end 116 intended for receipt within the interior cavity 118 of the axle housing when the breather assembly 100 is assembled thereto. The fitting further includes a generally tubular connecting portion 120 extending horizontally from the body portion and defining an interior passage 122 perpendicularly intersecting an interior passage 124 defined by the body portion and drainback tube portion.

Preferably, the body portion is provided with a hex-shaped or slotted head 126, allowing the fitting to be threaded into the breather bore 112 provided in the upper wall 60 of the axle housing.

Figure 2:
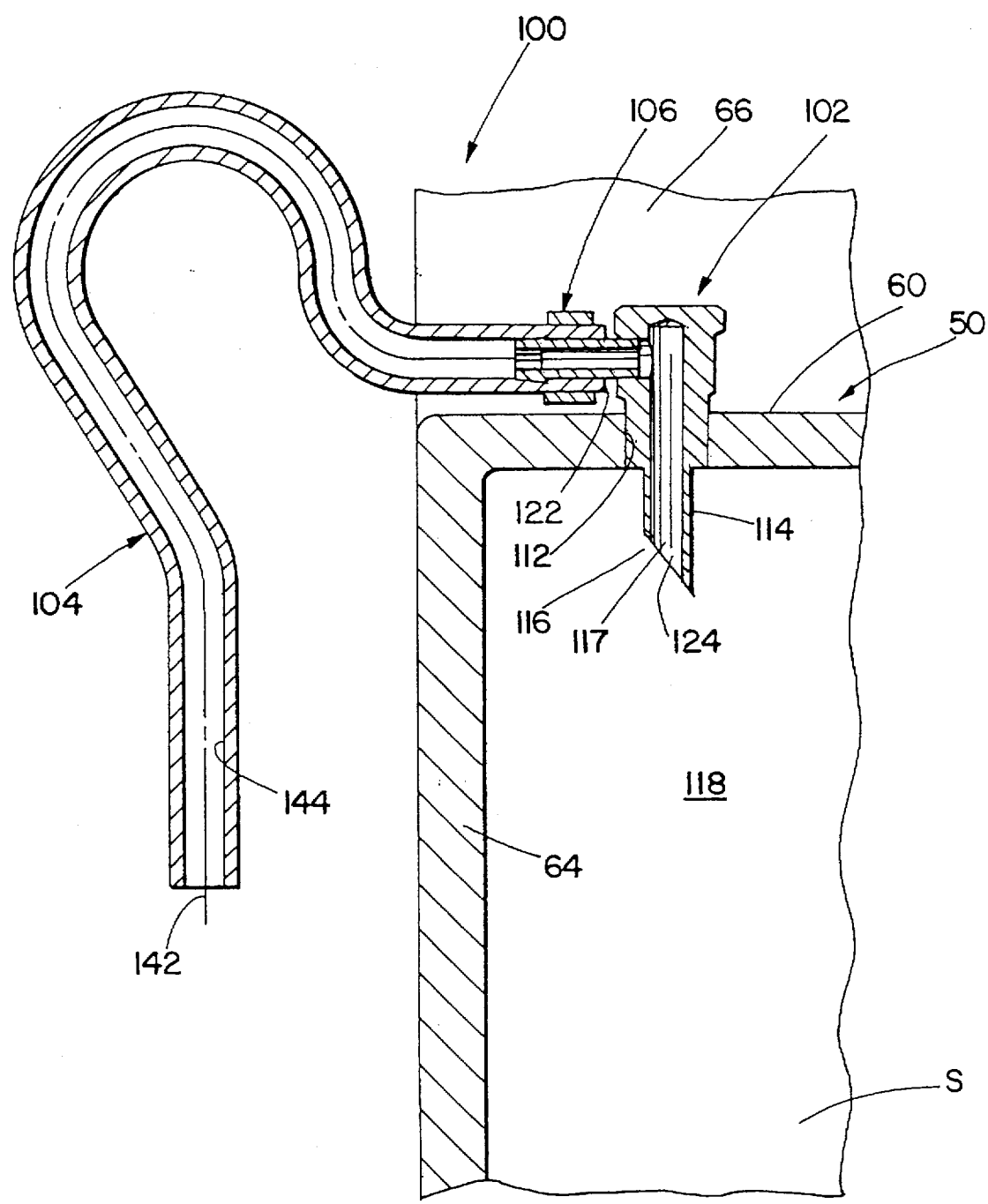
FIG. 2 is an enlarged sectional view taken on a vertical plane of the breather assembly of the present invention as installed in a heavy-duty vehicular drive axle.

The formed hose member 104 of the breather assembly defines a generally horizontally extending end 130 adapted to be received in a resilient interference fit over the barbed fitting end 132 of the connecting member 120 and, as best seen in FIG. 2, clamped into sealing engagement therewith by the hose clamp member 106. The hose member 104 includes the horizontally extending first portion defining a first end 130, an upwardly and outwardly curving second portion 134, a downwardly curving third portion 136, and a generally vertically extending fourth portion 140 leading to exterior breather opening or second end 142, which fluidly communicates with the atmosphere. Hose portion 104, thus, defines an interior passage 144 extending from the exterior breather opening 142 to the interior passage 122 defined by the connecting member 120 of the fitting member and, thus, communicates the interior of the axle housing 118 (at interior breather opening 117, defined at end 116 of the drainback tube portion) with the atmosphere through opening 142 to relieve pressure and vacuum buildup therein.

The drainback tube 114 prevents direct lubricant splash from escaping through the breather, while the beveled end 116 increases the surface opening of passage 124 to prevent the lubricant from bridging the opening. The multiple bends in the interior passage 144 of the hose portion 104 further prevents exterior water ingestion into the interior of the axle and minimizes lubricant leakage from the axle.

Figure 6A:
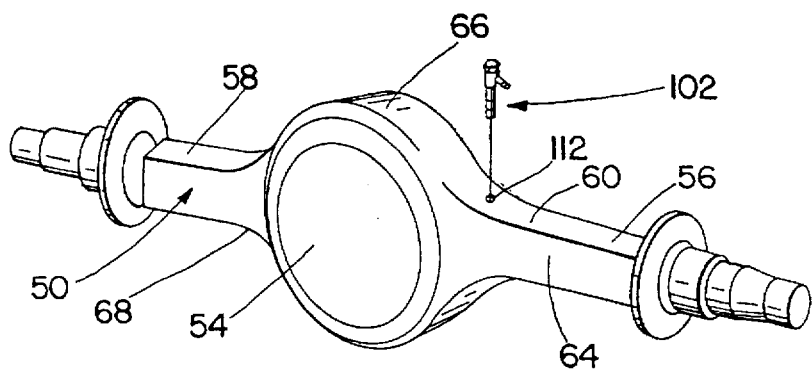
FIGS. 6A–6E illustrate the installation of the breather assembly of the present invention to a heavy-duty vehicular drive axle housing.
Figure 6B:
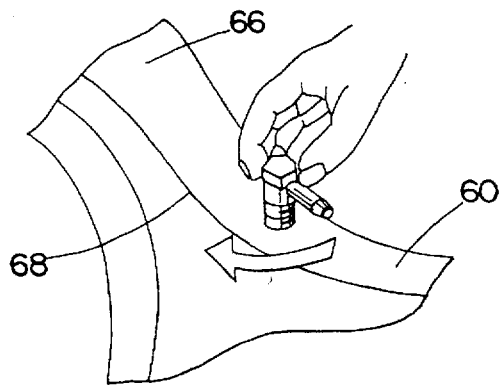
Figure 6C:
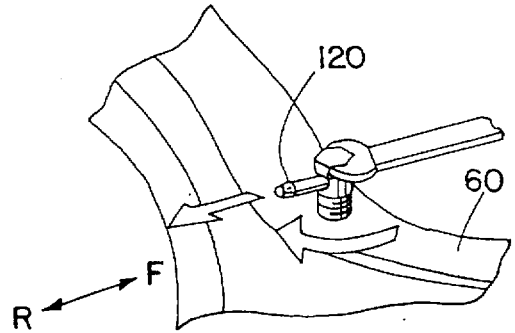
Figure 6D:
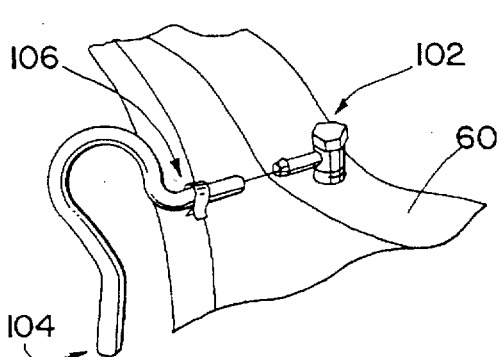
Figure 6E:
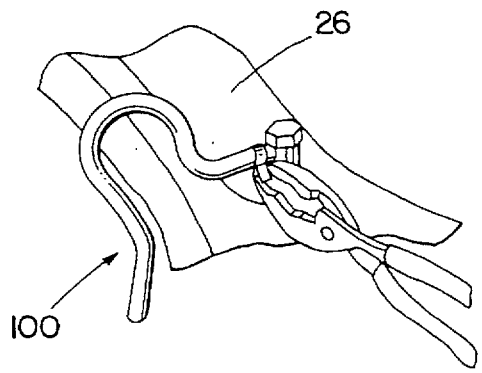

FIGS. 6A-6E sequentially illustrate the installation of the breather assembly 100 of the present invention onto an axle housing assembly. As may be seen by reference to FIGS. 6A and 6B, the fitting member 102, without the hose member or clamp member assembled thereto, is placed at the exterior opening to the breather hole 112 and is thereinto hand-threaded. Threading of the fitting into the axle housing may be completed using a wrench, as seen in FIG. 6C, to provide a fluid-tight seal with the connecting portion 120 of the fitting member facing rearwardly. The clamp 106 is then slid onto the end 130 of the hose member 104, and the horizontal end 130 of the hose member is then forced onto the exterior surface of the connecting member 120 (see FIG. 6D). The assembly is then completed (see FIG. 6E) by sliding the clamp member into position over the connecting portion of the fitting member and then tightening the clamp member to retain the hose member on the connecting member.

By way of example, in a heavy-duty axle application, the breather aperture with a diameter of about 0.75 inch, the drainback tube will extend about 1.0 to 2.0 inches into the cavity, and the hose will have an outer diameter of about 0.55 inche and an inner diameter of about 0.30 inch.

Accordingly, it may be seen that a relatively simple and inexpensive breather assembly is provided, which will effectively relieve built-up vacuum and pressure within an axle housing while effectively keeping lubricant in and exterior water out of the interior of the axle housing.

Although the present invention has been described with a certain degree of particularity, it is understood that various modifications and rearrangements of the parts thereof are possible without departing from the spirit and scope of the invention as hereinafter claimed.

We claim:

1. A breather assembly for a vehicular drive axle mechanism of the type having an axle housing defining an upper wall and a side wall, one of said walls having a breather aperture therethrough, said housing defining an interior cavity containing rotatable gearing and a lubricant sump, said breather assembly comprising:

a fitting member having a body portion for sealing receipt in said aperture with a first end within said cavity and a second end exterior of said cavity, a substantially vertically extending drainback tube portion extending downwardly from said first end of said body portion into said cavity and defining an interior breather opening at the lower end thereof and a connecting tube portion extending substantially horizontally from said second end of said body portion and defining an interior passage communicating with and substantially perpendicular to an interior passage defined by said drainback tube portion and extending to said interior breather opening; and a hollow formed hose member having a first end for fluid connection with said connecting tube portion, a substantially horizontally extending first hose portion extending outwardly from said first end, a substantially upwardly and outwardly curved second hose portion extending from said first hose portion, and a generally downwardly curved third hose portion extending from said second hose portion, and a second end defining an exterior breather opening.

2. The breather assembly of claim 1 wherein said hose member further comprises a substantially vertically extending fourth hose portion extending from said third hose portion to said second end.

3. The breather assembly of claim 2 wherein said exterior breather opening is lower than said interior breather opening.

4. The breather assembly of claim 2 wherein said breather aperture is a substantially vertically extending bore in said upper wall.

5. The breather assembly of claim 2 wherein said body portion is provided with external threads for engagement with internal threads provided in said breather aperture.

6. The breather assembly of claim 5 wherein said threads are pipe threads.

7. The breather assembly of claim 2 wherein said lower end of said drainback tube is beveled.

8. The breather assembly of claim 1 wherein said exterior breather opening is lower than said interior breather opening.

9. The breather assembly of claim 8 wherein said breather aperture is a substantially vertically extending bore in said upper wall.

10. The breather assembly of claim 1 wherein said breather aperture is a substantially vertically extending bore in said upper wall.

11. The breather assembly of claim 10 wherein said body portion is provided with external threads for engagement with internal threads provided in said breather aperture.

12. The breather assembly of claim 11 wherein said threads are pipe threads.

13. The breather assembly of claim 10 wherein said lower end of said drainback tube is beveled.

14. The breather assembly of claim 1 wherein said body portion is provided with external threads for engagement with internal threads provided in said breather aperture.

15. The breather assembly of claim 14 wherein said threads are pipe threads.

16. The breather assembly of claim 14 wherein said lower end of said drainback tube is beveled.

17. The breather assembly of claim 1 wherein said lower end of said drainback tube is beveled.

18. The breather assembly of claim 1 wherein said first end of said hose member is received in an interference fit over said connecting member.

19. The breather assembly of claim 18 further comprising a clamp member for clamping said first end of said hose member over said connecting member.

20. The breather assembly of claim 19 wherein said connecting member has a barbed end.

21. The breather assembly of claim 18 wherein said connecting member has a barbed end.

22. A vehicular drive axle (10) mechanism of the type having an axle housing (26) defining an upper wall (60) having an outer surface and a side wall (64) having an outer surface, one of said walls having a breather aperture (112) therethrough, said housing defining an interior cavity (118) containing rotatable gearing and a lubricant sump (S) and a breather assembly (100) comprising:

a fitting member (102) having a body portion (108) for sealing receipt in said aperture with a first end within said cavity and a second end exterior of said cavity, a substantially vertically extending drainback tube portion (114) extending downwardly from said first end of said body portion into said cavity and defining an interior breather opening (117) at the lower end (116) thereof and a connecting tube portion extending generally horizontally from said second end of said body portion and defining an interior passage (122) communicating with and substantially perpendicular to an interior passage (124) defined by said drainback tube portion and extending to said interior breather opening; and a hollow formed hose member (104) having a first end (130) for fluid connection with said connecting tube portion, a substantially horizontally extending first hose portion extending outwardly from said first end, a generally upwardly and outwardly curved second hose portion (134) extending from said first hose portion, and a generally downwardly curved third hose portion (136) extending from said second hose portion, and a second end (142) defining an exterior breather opening.

23. The mechanism of claim 22 wherein said hose member further comprises a substantially vertically extending fourth hose portion (140) extending from said third hose portion to said second end.

24. The mechanism of claim 23 wherein said exterior breather opening is lower than said interior breather opening.

25. The mechanism of claim 22 wherein said exterior breather opening is lower than said interior breather opening.

26. The mechanism of claim 22 wherein said breather aperture is a substantially vertically extending bore in said upper wall.

27. The mechanism of claim 26 wherein said body portion is provided with external threads for engagement with internal threads provided in said breather aperture.

28. The mechanism of claim 27 wherein said threads are pipe threads.

29. The mechanism of claim 26 wherein said lower end of said drainback tube is beveled.

30. The mechanism of claim 23 wherein said breather aperture is a substantially vertically extending bore in said upper wall.

31. The mechanism of claim 23 wherein said breather aperture is a substantially vertically extending bore in said upper wall, said connecting portion and said first hose portion extend generally parallel to the outer surface of said upper wall and said fourth hose portion extends generally parallel to the outer surface to said side wall.

32. The mechanism of claim 31 wherein said body portion is provided with external threads for engagement with internal threads provided in said breather aperture.

33. The mechanism of claim 32 wherein said threads are pipe threads.

34. The mechanism of claim 22 wherein said body portion is provided with external threads for engagement with internal threads provided in said breather aperture.

35. The mechanism of claim 34 wherein said threads are pipe threads.

36. The mechanism of claim 22 wherein said lower end of said drainback tube is beveled.

37. The mechanism of claim 23 wherein said lower end of said drainback tube is beveled.

38. The mechanism of claim 22 wherein said first end of said hose member is received in an interference fit over said connecting member.

39. The mechanism of claim 38 further comprising a clamp member (106) for clamping said first end of said hose member over said connecting member.

* * * * *